US009811680B2

(12) United States Patent
Balasubramanian et al.

(10) Patent No.: US 9,811,680 B2
(45) Date of Patent: Nov. 7, 2017

(54) SECURE STORAGE AND SHARING OF DATA BY HYBRID ENCRYPTION USING PREDEFINED SCHEMA

(71) Applicant: Microsoft Technology Licensing, LLC, Redmond, WA (US)

(72) Inventors: Guru Balasubramanian, Charlotte, NC (US); ChenFei Wu, Shanghai (CN); Wenyuan Wang, Shanghai (CN); Jingjing Zhao, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 14/731,262

(22) Filed: Jun. 4, 2015

(65) Prior Publication Data
US 2016/0357980 A1    Dec. 8, 2016

(51) Int. Cl.
*H04L 29/06*  (2006.01)
*H04L 9/32*   (2006.01)
(Continued)

(52) U.S. Cl.
CPC ........ *G06F 21/6218* (2013.01); *H04L 9/0822* (2013.01); *H04L 9/0825* (2013.01);
(Continued)

(58) Field of Classification Search
CPC ... G06F 21/6218; H04L 9/0631; H04L 9/302; H04L 63/045
(Continued)

(56) References Cited

U.S. PATENT DOCUMENTS 5,142,578 A    8/1992  Matyas et al.
5,850,443 A   12/1998  Van Oorschot et al.
(Continued)

FOREIGN PATENT DOCUMENTS

CN    101123495 A    2/2008
EP      2680207 A1    1/2014

OTHER PUBLICATIONS

Fujisaki, et al., "Secure Integration of Asymmetric and Symmetric Encryption Schemes", In Proceedings of the 19th Annual International Cryptology Conference on Advances in Cryptology, Aug. 15, 1998, pp. 537-554.

*Primary Examiner* — Saleh Najjar
*Assistant Examiner* — Feliciano Mejia
(74) *Attorney, Agent, or Firm* — International IP Law Group, PLLC

(57) ABSTRACT

The claimed subject matter includes techniques for storing, retrieving and sharing files. An example system includes a key generator module to generate a secret key. The example system also includes a symmetric encryption module to encrypt raw data by symmetric encryption using the secret key. The example system further includes an asymmetric encryption module to encrypt the secret key and symmetric encryption information by asymmetric encryption using a public key to produce a key block. The examples system also further includes a schema module to generate a ciphertext file with predefined schema including asymmetric encryption information, the key-block, and the encrypted raw data. The example system also includes a storage module to send the ciphertext file including the encrypted raw data to a server for storage.

15 Claims, 10 Drawing Sheets

(51) Int. Cl.
*H04L 9/14* (2006.01)
*G06F 21/62* (2013.01)
*H04L 9/08* (2006.01)

(52) U.S. Cl.
CPC ............... *H04L 9/14* (2013.01); *H04L 63/04* (2013.01); *H04L 63/045* (2013.01)

(58) Field of Classification Search
USPC .......................... 713/165, 168, 167; 380/259
See application file for complete search history.

(56) References Cited

U.S. PATENT DOCUMENTS

| | | | |
|---|---|---|---|
| 7,424,114 B2 | 9/2008 | Joye et al. | |
| 7,486,651 B2 | 2/2009 | Hagiwara et al. | |
| 7,668,313 B2 | 2/2010 | Nave | |
| 7,760,904 B2 | 7/2010 | Kuzmich et al. | |
| 7,987,361 B2 | 7/2011 | Han et al. | |
| 8,099,598 B1* | 1/2012 | Liu | H04L 9/006 380/255 |
| 8,880,887 B2* | 11/2014 | Armatis | H04L 63/061 380/255 |
| 9,195,851 B1* | 11/2015 | Chandra | H04L 9/0894 |
| 9,246,678 B2* | 1/2016 | Nayshtut | H04L 9/0825 |
| 2003/0235307 A1* | 12/2003 | Miyamoto | H04L 9/002 380/269 |
| 2010/0005318 A1* | 1/2010 | Hosain | H04L 9/088 713/193 |
| 2013/0019111 A1 | 1/2013 | Martin | |
| 2013/0073850 A1 | 3/2013 | Zaverucha | |
| 2014/0281520 A1* | 9/2014 | Selgas | H04L 63/0442 713/165 |
| 2014/0310521 A1 | 10/2014 | Ichikawa et al. | |

* cited by examiner

SECURE STORAGE AND SHARING OF DATA BY HYBRID ENCRYPTION USING PREDEFINED SCHEMA

BACKGROUND

Data centers may include sensitive data. Such sensitive data can be protected during transfer and storage using encryption. For example, two types of encryption include symmetric encryption that uses one key and asymmetric encryption that uses two keys.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system for storing files. The system includes a key generator module to generate a secret key. The system can also include a symmetric encryption module to encrypt raw data by symmetric encryption using the secret key. The system can further include an asymmetric encryption module to encrypt the secret key and symmetric encryption information by asymmetric encryption using a public key to produce a key block. The system can also include a schema module to generate a ciphertext file with predefined schema including asymmetric encryption information, the key-block, and the encrypted raw data. The system can also further include a storage module to send the ciphertext file including the encrypted raw data to a server for storage.

Another implementation provides a system for retrieving files. The system includes a retrieval module to send a public key and a request for a ciphertext file including a key block and encrypted data and receive the ciphertext file with the key block encrypted using the public key. The system can also include an asymmetric encryption module to decrypt the key block of the encrypted file using a client private key and asymmetric encryption information in the ciphertext file to obtain a secret key and symmetric encryption information. The system can further include a symmetric encryption module to decrypt the encrypted data using the secret key and the symmetric encryption information.

Another implementation provides method for transferring encrypted data. The method can include receiving client identification information and a request from a first client for a ciphertext file including an encrypted key block encrypted by a second client. The method can include performing permission check based on the client identification information from the first client. The method can also include retrieving the ciphertext file from a storage device and reading asymmetric encryption information from schema in the ciphertext file if the permission check passes. The method can further include decrypting the key block in the ciphertext file using the asymmetric encryption information. The method can also further include encrypting the key block by asymmetric encryption using the public key of the first client to generate a new encrypted key block. The method can also include replacing the existing key block in the ciphertext file with the new encrypted key block to generate an updated ciphertext file. The method can also further include sending the updated ciphertext file with the new encrypted key block to the first client.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Sensitive data is increasingly stored and shared among clients at companies. For example, such data may contain trade secrets among other work product to be secured. The sensitive data can be encrypted with symmetric encryption or asymmetric encryption techniques. However, symmetric encryption provides less security than asymmetric encryption, while asymmetric encryption is slow and resource intensive. For example, in the traditional way of sharing sensitive data, if Party A wants to share some sensitive data with Party B, Party A will have and maintain Party B's certificate public key. Sharing certificates thus introduces a maintenance cost of maintaining the certificates. If the information is shared with multiple parties, the maintenance cost can increase dramatically among different parties.

This disclosure describes techniques to store and retrieve data using encrypted key blocks in a form of hybrid encryption. The hybrid encryption techniques include using a secret key to encrypt the sensitive data using symmetric encryption and a public key to encrypt the secret key and symmetric encryption information into a key-block. Ciphertext can thus be generated including asymmetric encryption information, the key-block and the encrypted data file. In some embodiments, the ciphertext includes a predefined schema. For example, the predefined schema can provide a defined structure and content for the ciphertext. In some examples, a security server can be used to provide additional security by handling the keys and asymmetric encryption.

The techniques thus can enable sensitive data to be stored, retrieved, and shared both efficiently and securely. For example, the techniques can reduce the amount of time and resources used for encryption as compared to asymmetric encryption as shown below. Moreover, the use of a separate security server provides extra security for particularly sensitive data. Thus, the techniques also enable different levels of security to be applied to predefined types of data. For example, sensitive data with a high level of security can be stored and transferred using an information exchange server and decrypted using an additional security server. The information exchange server and security server manage the process of storing, retrieving, and sharing the sensitive data centrally, which simplifies the maintenance process and saves resources. Sensitive data with a medium or lower level of security can be encrypted and stored using the techniques on a server without additional security software. These techniques are described in more detail below.

Figure 9:
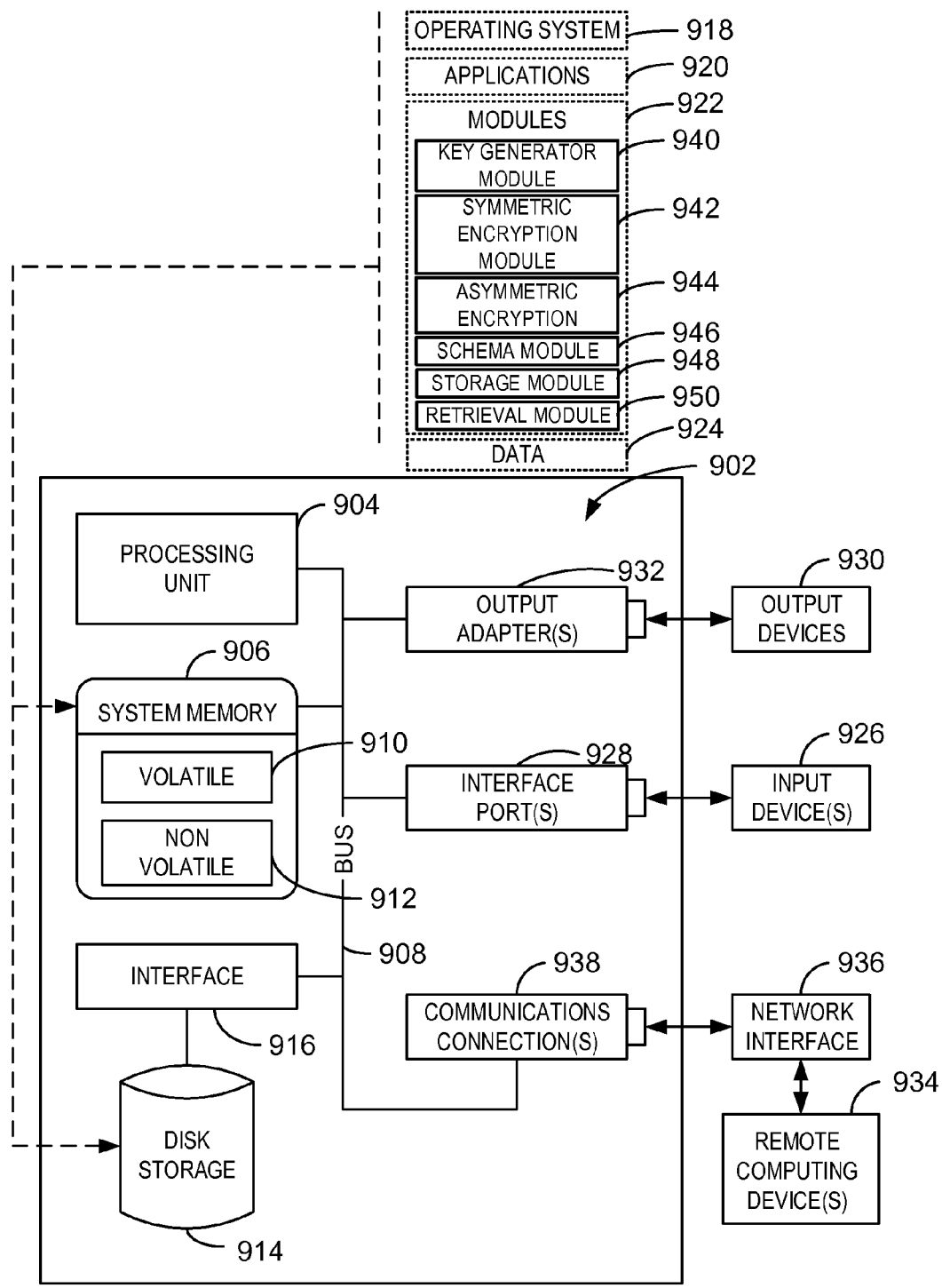
FIG. 9 is a block diagram of an example operating environment configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 9, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. Moreover, computer-readable storage media does not include communication media such as transmission media for wireless signals. In contrast, computer-readable media, i.e., not storage media, may include communication media such as transmission media for wireless signals.

Figure 1:
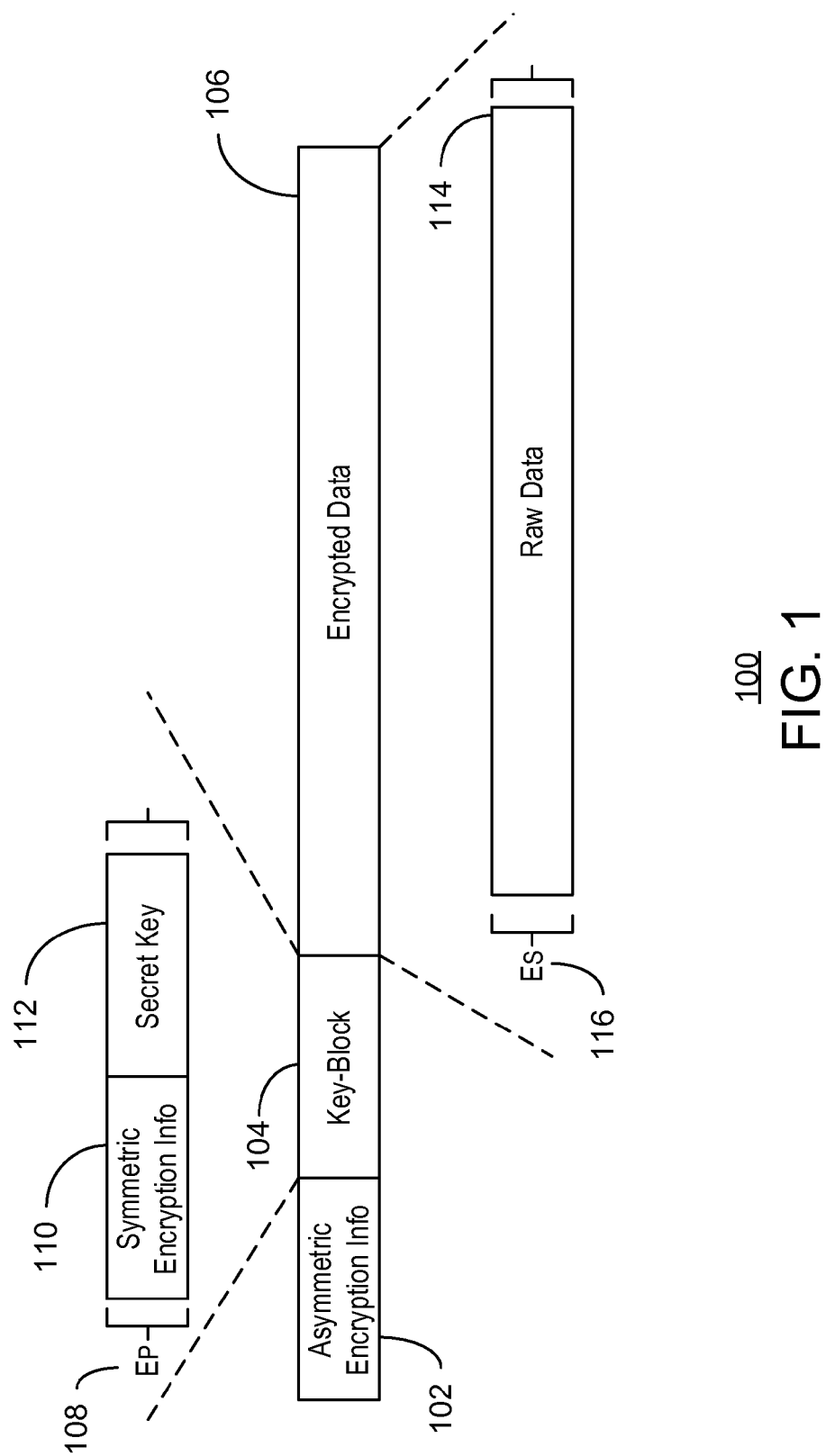
FIG. 1 is a block diagram of example hybrid encrypted data for use with the techniques described herein.

FIG. 1 is a block diagram of example hybrid encrypted data for use with the techniques described herein. The example hybrid encrypted data is generally referred to by the reference number 100.

The example hybrid encrypted data 100 includes asymmetric encryption information 102, a key block 104, and encrypted data 106. The key block 104 is encrypted by asymmetric encryption using a public key ($E_P$) 108 and includes symmetric encryption information 110 and a secret key 112. The encrypted data 106 includes raw data 114 that is encrypted by symmetric encryption using the secret key ($E_S$) 116.

In the example of FIG. 1, sensitive information in the form of raw data 114 can be encrypted using any suitable symmetric encryption 116. For example, the raw data 114 can be encrypted using the Advanced Encryption Standard (AES), among others. A randomized secret key 112 can be generated by a client and used to encrypt the raw data 114 using symmetric encryption 116. The symmetric encryption information 110 and secret key 112 used for symmetric encryption 116 can then be stored in a key block 104 and encrypted using any suitable form of asymmetric encryption 108. For example, the key block 104 can be encrypted using a cryptographic encryption algorithm such as the Ron Rivest, Adi Shamir, and Leonard Adleman (RSA) algorithm. The symmetric encryption information 110 can include information such as the symmetric encryption algorithm used for encryption, and a secret key size. The key block 104 can then be stored in a header of the hybrid encrypted data 100. The asymmetric encryption information 102 to be later used to decrypt the key block 104 can also be stored in the header of the hybrid encrypted data 100. For example, the asymmetric encryption information 102 can include the asymmetric encryption algorithm used to encrypt the data, a thumbprint, and a key block size.

In some examples, the hybrid encrypted data 100 can then be stored in a storage device. For example, the storage device can be persistent storage accessible to multiple clients via the Information Exchange Service.

Figure 2:
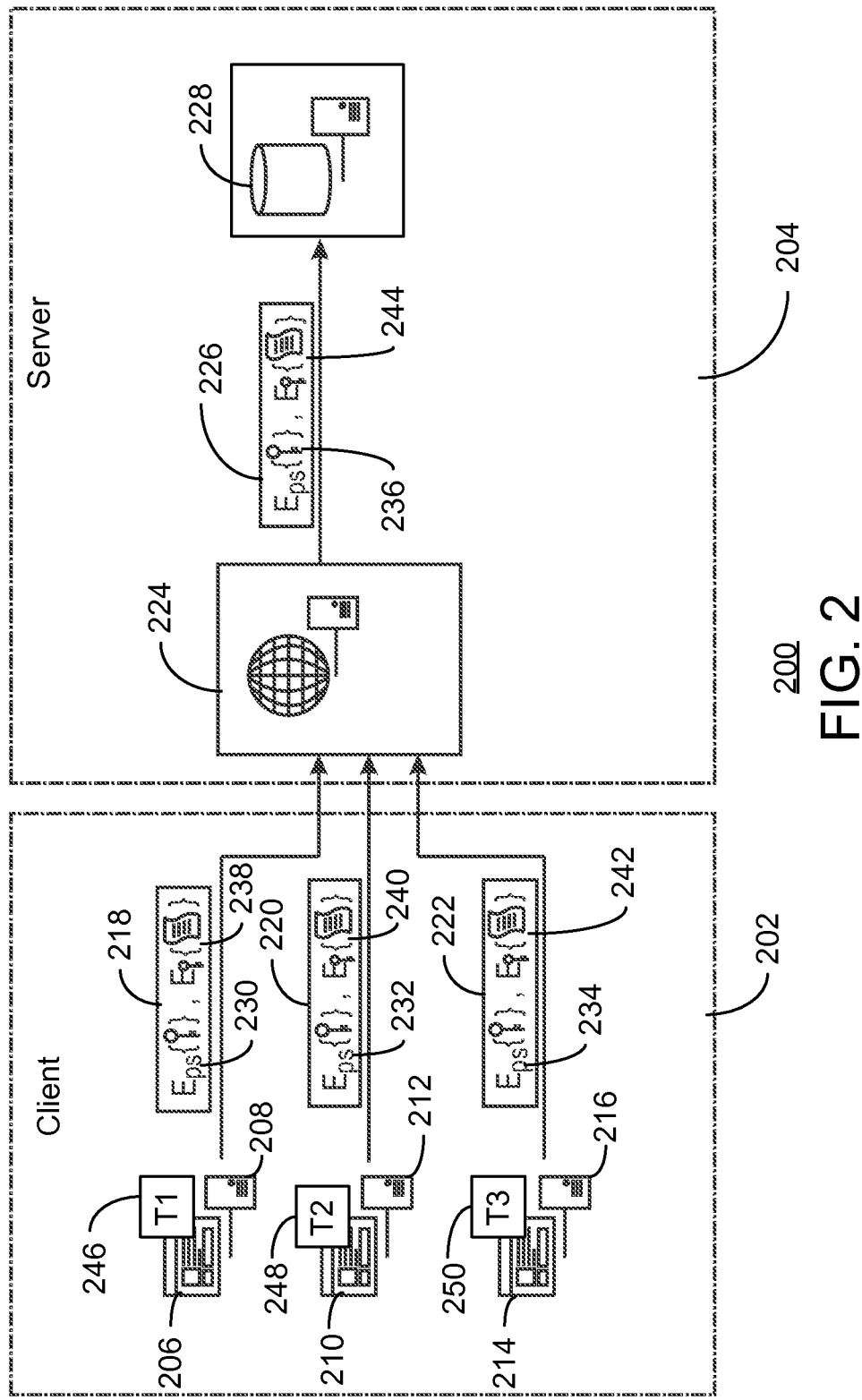
FIG. 2 is a block diagram of an example system for storing data securely.

FIG. 2 is a block diagram of an example system for storing data securely. The example system of FIG. 2 is referred to generally by the reference number 200.

In the example system 200, client side 202 functionality stores data to a server side 204 functionality. The client side 202 includes an application 206 on a client 208, and application 210 on a client 212, and an application 214 on a client 216. Thus, multiple client devices 208, 212, 216 can access server 224 at any point in time. The client 208 is shown sending encrypted data 218, the client 212 is shown sending encrypted data 220, and the client 216 is shown sending encrypted data 222. The server 224 receives that encrypted data 218, 220, 222 and stores the encrypted data 226, representing encrypted data 218, 220, or 222, to a storage server 228. The encrypted data 218, 220, 222, and 226 each include an encrypted key block 230, 232, 234, 236 and encrypted data 238, 240, 242, 244, respectively. For example, the encrypted data 244 can correspond to the encrypted data 238, 240, or 242. The clients 206, 210, 214 also contain private keys 246, 248, and 250, respectively.

In the example system 200, a client 208 may include an application 206 to encrypt sensitive data using the techniques described in FIG. 1 above and send the encrypted data file 218 to the server 224. For example, the server 224 can be an Information Exchange Service server, among others. The application 206 can generate a random secret key and encrypt sensitive data using symmetric encryption and generate the encrypted data 238. For example, the symmetric encryption can be AES, among others. The application 206 can encrypt the key block 230 including symmetric encryption information for the encrypted data 238 by asymmetric encryption using a service public key received from the server 224. For example, the asymmetric encryption used can be RSA. The encrypted data file 218 can then be sent to a server 224. The server 224 can send the encrypted data file 218, also represented in FIG. 2 as encrypted data file 226, directly to storage server 228 for storage. Thus, no further processing is required by the server 224 or the storage server 228 when storing the encrypted data file 226. In some examples, the clients 208, 212, and 216, can also send public keys corresponding to private keys 246, 248, 250 to the server 224 for use in retrieval of encrypted data files as detailed in FIG. 3 below.

The diagram of FIG. 2 is not intended to indicate that the example system 200 is to include all of the components shown in FIG. 2. Rather, the example system 200 can include fewer or additional components not illustrated in FIG. 2 (e.g., additional clients, servers, data files, etc.).

Figure 3:
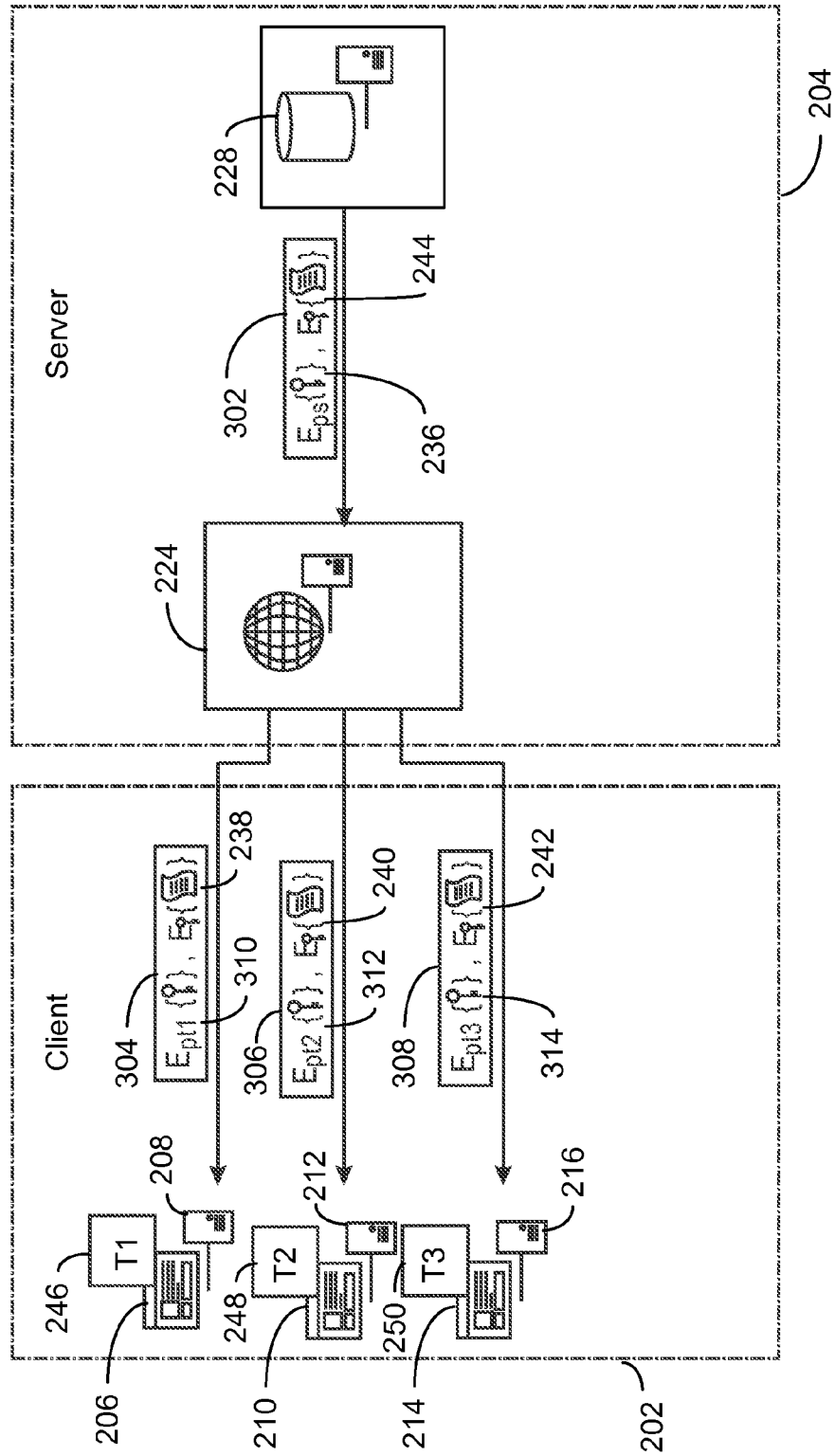
FIG. 3 is a block diagram of an example system for retrieving and sharing data securely.

FIG. 3 is a block diagram of an example system for retrieving and sharing data securely. The example system 300 can be implemented using the computer 1002.

The example system 300 again shows client side 202 functionality and server side functionality 204. The client side 202 includes servers 208, 212, 216 with applications, 206, 210, 214. The server side 204 functionality includes a server 224 and a storage server 228. The storage server 228 is shown sending encrypted data 302 to server 224. Server 224 is shown sending encrypted data 304, 306, 308 to clients 208, 212, 216, respectively. The data 302 includes a key block 236 encrypted by asymmetric encryption using the service public key "ps". The data 302 also includes encrypted data 244, corresponding to encrypted data 238, 240, or 242. The data 304 includes encrypted data 238 and a key block 310 encrypted asymmetrically using a client T1 public key. The data 306 includes encrypted data 240 and a key block 312 encrypted asymmetrically using a client T2 public key. The data 308 includes encrypted data 242 and a key block encrypted asymmetrically using a public T3 key. Clients 208, 212, 216 also include T1 private key 246, T2 private key 248, T3 private key 250, respectively.

In the example system 300 of FIG. 3, the server 224 receives public keys T1, T2, T3 corresponding to private keys 246, 248, 250 from clients 208, 212, 216, respectively. In response to a client 208 requesting a particular data file 304, the server 224 can check the permissions of client 208. If client 208 does not have permission to access the particular data file 304, then an error may be returned to client 208. If the client 208 has permission to access the data file 304, then the server 224 can locate and retrieve a corresponding data file 302 from the storage server 228. The server 224 can then use a service private key to decrypt key block 236 that was encrypted asymmetrically using an associated service public key before being stored as described in detail in FIG. 2 above. The server 224 can then use the corresponding public key of the client requesting the file 302 to encrypt the key block 236 asymmetrically again using a corresponding client public key. For example, if the client 208 requested the data file 302, then the server 224 can decrypt the key block 236 of data file 302 and use the public key T1 to encrypt the decrypted key block 236 into an encrypted key block 310 and send the resulting encrypted data file 304 to client 208. Client 208 can then use an associated T1 private key 246 to decrypt the key block 310. After decrypting the key block 310, the client 208 can use the decrypted secret key to decrypt the encrypted data 238 and access the information stored therein.

Thus, the present techniques use asymmetric encryption of key blocks at the server 224 to retrieve the encrypted data file 302 securely and efficiently. Asymmetric encryption is performed at the server 224 to decrypt and encrypt the key block of data file 302, but the symmetric encryption and decryption of the raw data is performed at the client side 202. Thus, the present techniques are much more scalable and efficient than using symmetric encryption alone.

The diagram of FIG. 3 is not intended to indicate that the example system 300 is to include all of the components shown in FIG. 3. Rather, the example system 300 can include fewer or additional components not illustrated in FIG. 3 (e.g., additional clients, servers, encrypted data files, etc.).

Figure 4:
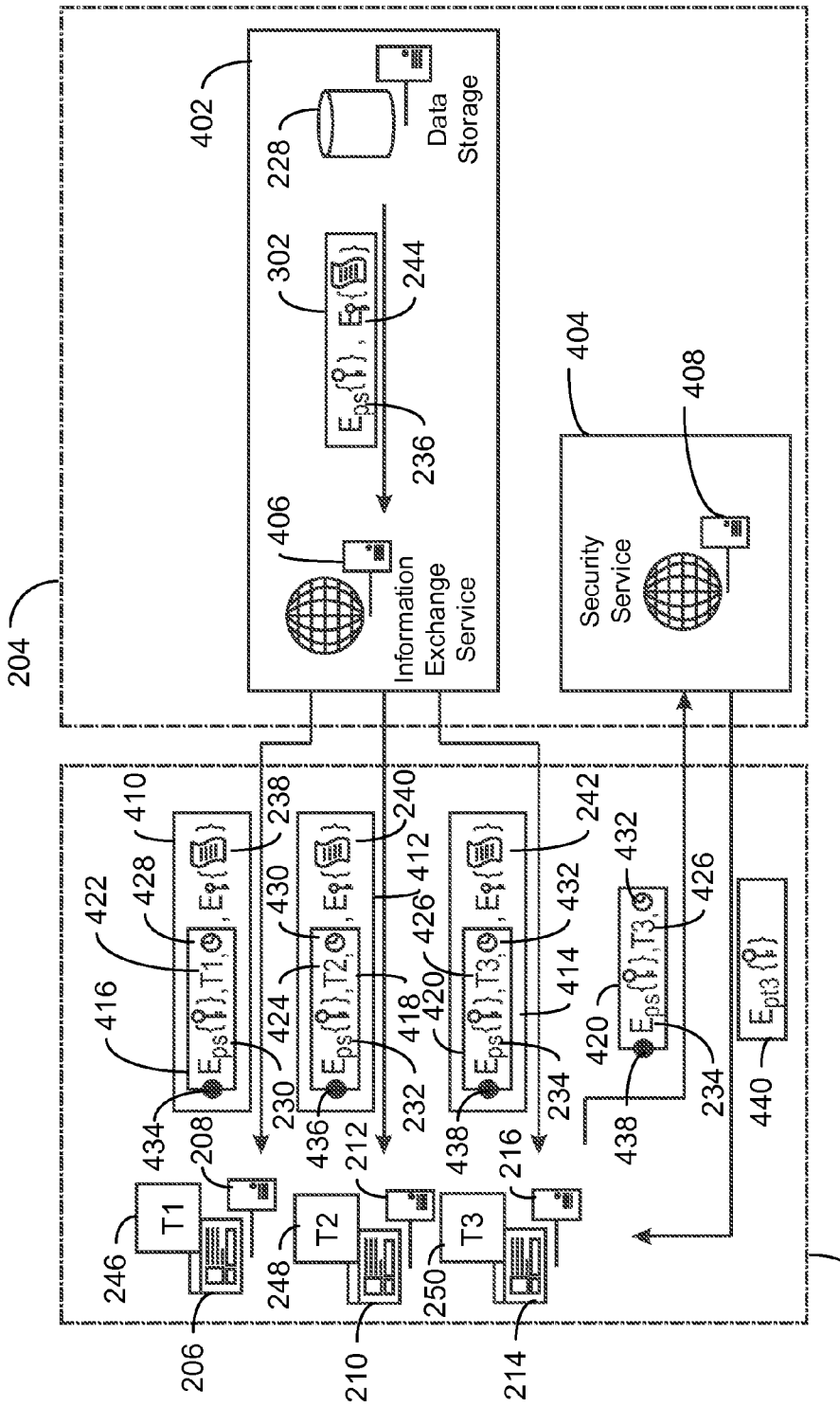
FIG. 4 is a block diagram of an example system for retrieving and sharing data using a security service.

FIG. 4 is a block diagram of an example system for retrieving and sharing data using a security service. The example system 400 can be implemented using the computer 1002.

The example system 400 includes client side 202 functionality and server side functionality 204. The client side 202 functionality includes clients 208, 212, 216 running applications 206, 210, 214, respectively. The clients 208, 212, 216 also contain private keys T1 246, T2 248, and T3 250, respectively. The server side 204 functionality is divided into storage and retrieval 402 functionality and security 404 functionality. The storage and retrieval 402 functionality include storage 228 and server 406. An encrypted data file 302 is shown being transferred from storage 228 to server 406. The encrypted data file 302 includes encrypted data 244, corresponding to encrypted data 238, 240, or 242, and an encrypted key block 236. The security 404 functionality includes a security service on a security server 408. The server 406 is shown sending encrypted files 410, 412, 414 to clients 208, 212, 216, respectively. The encrypted files 410, 412, 414, include encrypted data 238, 240, 242 and asymmetric encryption information 416, 418, 420, respectively. The asymmetric encryption information 416, 418, 420 includes public key information T1 422, T2 424, and T3 426, respectively. The asymmetric encryption information 416, 418, 420 also includes an encrypted key block 230, 232, 234 that is encrypted using a service public key. The asymmetric encryption information 416, 418, 420 can also include timestamps 428, 430, 432, respectively. Moreover, the asymmetric information 416, 418, 420 can be digitally signed using digital signatures 434, 436, 438. In addition, client 216 is shown sending the asymmetric encryption information 420 to the security server 408. The security information 438 includes encrypted key block 234, public key information T3 426, and the timestamp 432. The security server 408 is shown sending a key block 440 encrypted asymmetrically using the T3 public key to client 216.

In the example system 400 of FIG. 4, clients 208, 212, 216 can securely retrieve files from data storage 228 using Information Exchange Service 406, and then request corresponding decryption information from security server 408. For example, the client 216 can send a request for a particular data file. In response to a request for a particular data file, the server 406 can retrieve the requested data file 302 from the storage 228. The server 406 can then read the asymmetric encryption information from the data file 302. The server 406 can append additional information to the data file 302. For example, the additional information can include a public key 426 corresponding to the requesting client 216 and a current time stamp 432. The server 406 can then protect the asymmetric encryption information 420 using a digital signature 438. For example, the digital signature can be performed using a dedicated private key for digital signatures. The server 406 can then replace the original asymmetric encryption information 236 with the digitally signed encryption information 438. The encrypted file 414 with digitally signed encryption information 420 can then be sent to the client 216. The client 216 can receive the encrypted file 414 and detect the digitally signed encryption information 420. The client can then send the digitally signed encryption information 420 to a security server 408. The security service of security server 408 can receive the asymmetric information 420 from the client and use a public key to verify the digital signature and the asymmetric information. For example, the public key can be a dedicated public key from the server 406. If the digital signature fails verification, then the security server 408 may return an error message. If the digital signature is verified as valid, then the security service of security server 408 can proceed processing the request. The security service of security server 408 can proceed by verifying the identification information of client 216. For example, the security service of security server 408 can retrieve the client's 216 T3 public key and compare the information in T3 public key to the identification information of client 216. If the information in T3 public key differs from the identification information provided by client 216, then the request can be rejected and an error message may be sent. If the information in T3 public key matches the identification information from client 216, then the security service of security server 408 can proceed processing the request. The security service of security server 408 can then proceed by verifying the time stamp 432 provided by the client 216. If the time stamp 432 is expired, then the request can be rejected and a suitable error message sent. If the time stamp is not expired, then the security service of security server 408 can continue processing the request.

Still referring to FIG. 4, after validation is passed, the security server 408 can retrieve the asymmetric encryption information 234. The security server 408 can include a service private key corresponding to the service public key. The security service of security server 408 can use the asymmetric encryption information 234 and the service private key to decrypt the secret key and symmetric encryption information. The security service on security server 408 can then encrypt the secret key and symmetric encryption information by asymmetric encryption using a public key 426 corresponding to the private key 250 of client 216 to create a new key block 436. The key block 440 can then be sent back to the client 216 for use in decrypting the encrypted data 242. The client 216 can receive the key block 440 and decrypt the key block 440 using the private key corresponding to the public key 426 to access the secret key and symmetric encryption information. The client 216 can then use the secret key and symmetric encryption information from key block 440 to decrypt the encrypted data 242.

Thus, the present techniques provide additional security for particularly sensitive files through the use of a security server 408. For example, the security server 408 may have higher security policies than the server 406. The security server 408 can have a security service that can verify the identity of the clients, as well as store keys such as the public key of the server 406, and the public keys of clients, 208, 212, 216. By requiring prior verification of identification, the present techniques prevent the use of brute force attacks on the public keys.

The diagram of FIG. 4 is not intended to indicate that the example system 400 is to include all of the components shown in FIG. 4. Rather, the example system 400 can include fewer or additional components not illustrated in FIG. 4 (e.g., additional clients, servers, storage, security servers, etc.).

Figure 5:
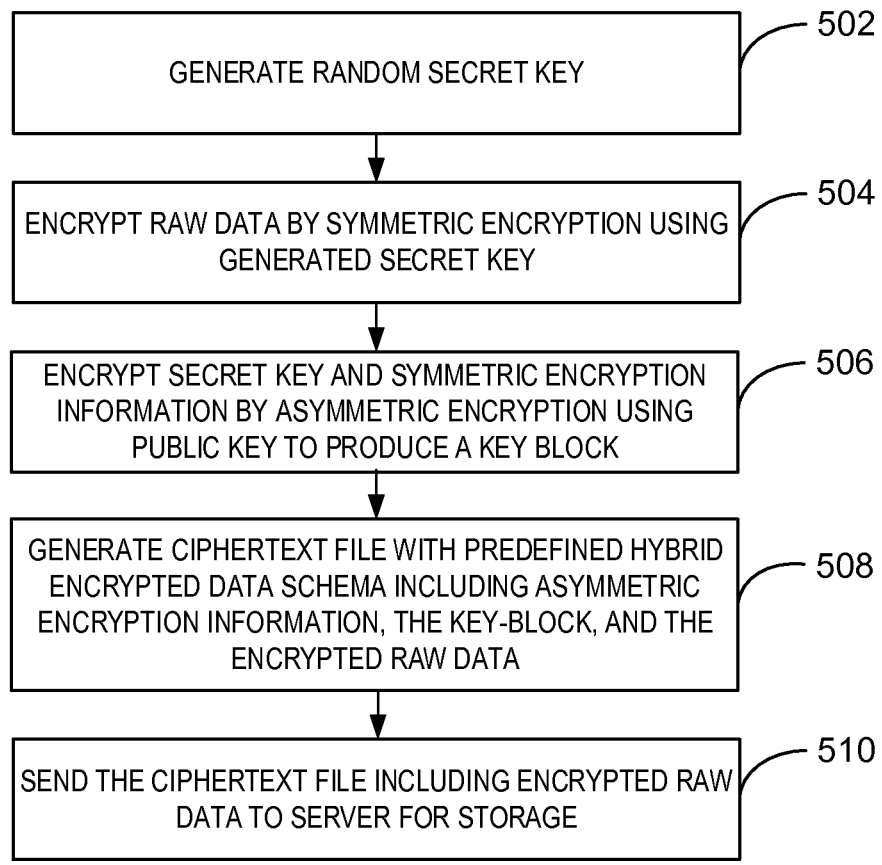
FIG. 5 shows a process flow diagram of an example method for storing data securely.

FIG. 5 shows a process flow diagram of an example method for storing data securely. The example method is generally referred to by the reference number 500 and can be implemented using computer 1002. The example method 500 is also discussed with reference to the example system 200.

At block 502, a client generates a random secret key. For example, the secret key can be randomly generated by a client. For example, the secret key can be generated using any appropriate random security key generator. The public key can be received from server 224 and can correspond to a private key on the server 224 for use in asymmetric encryption of the secret key. In some examples, the client can also receive a public key from the server 224.

At block 504, the client encrypts raw data by symmetric encryption using the generated secret key. For example, the raw data can be any sensitive data that is to be stored and/or transferred to another computer. In some examples, the secret key can be randomly generated each time that raw data is to be stored and/or transferred to another computer.

At block 506, the client encrypts the secret key and symmetric encryption information by asymmetric encryption using the public key to produce a key block. For example, the asymmetric encryption can use an RSA-based algorithm, among others.

At block 508, the client generates a ciphertext file with a predefined hybrid encrypted data schema including asymmetric encryption information, the key block, and the encrypted raw data. In some examples, the schema can take the form: [Asymmetric encryption type, asymmetric encryption size], $E_{ps}\{$[Symmetric encryption type, symmetric encryption size, secret key]$\}$, $E_{sk}\{$Raw Data$\}$, where $E_{ps}$ represents asymmetric encryption using a service public key and $E_{sk}$ represents symmetric encryption using a secret key. For example, the ciphertext file can be [RSA, 256 Bytes], $E_{ps}\{$[AES, 64 Bytes, secret key]$\}$, $E_{sk}\{$Raw Data$\}$.

At block 510, the client sends the ciphertext file including the encrypted raw data to a server for storage. For example, the storage can be a persistent storage. In some examples, the server can be an Information Exchange server, among others. Therefore, the client can send or transmit data to a server or external computing device using an encrypted ciphertext file rather than transmitting unencrypted data.

This process flow diagram is not intended to indicate that the blocks of the method 500 are to be executed in any particular order, or that all of the blocks are to be included in every case. Further, any number of additional blocks not shown may be included within the method 500, depending on the details of the specific implementation.

Figure 6:
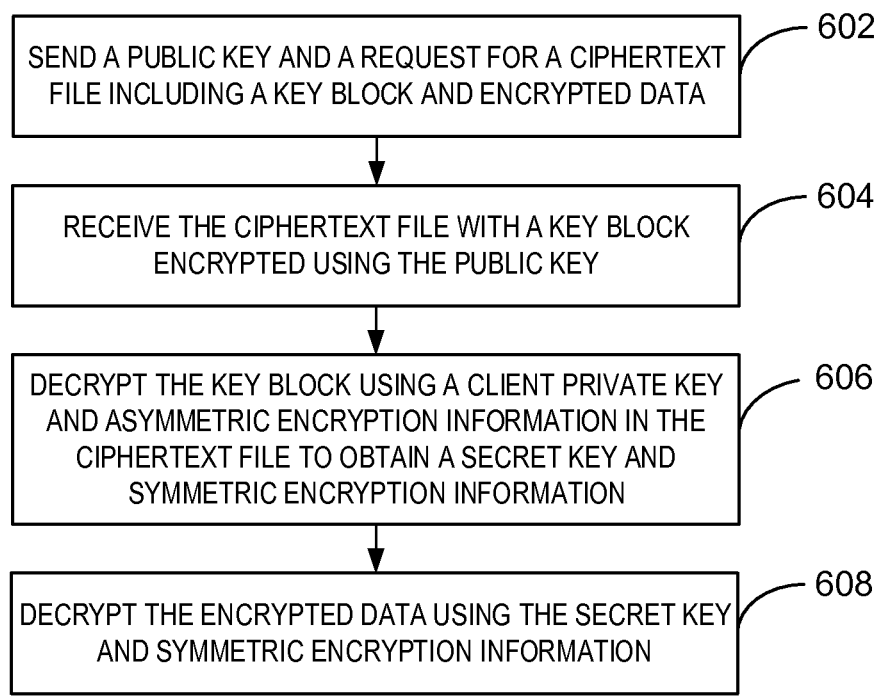
FIG. 6 shows a process flow diagram of an example method for retrieving data securely.

FIG. 6 shows a process flow diagram of an example method for retrieving data securely. The method is generally referred to by the reference number 600 and can be implemented using computer 1002. The example method 600 is also discussed with reference to the example system 300 and can be implemented using clients 208, 212, or 216.

At block 602, a client sends a public key and a request for a ciphertext file including a key block and encrypted data. For example, the public key can correspond to a private key 246, 248, 250 on the client 208, 212, 216. The public key can be stored on server 224. The key block can include encrypted secret key and asymmetric encryption information.

At block 604, the client receives the ciphertext file with a key block 310, 312, 314 encrypted using the public key. For example, the server 224 may have located the ciphertext file on the storage 228 and decrypted the key block 236 using a service private key. The server 224 may then have encrypted the key block using the public key corresponding to the private key 246, 248, 250, of the requesting client. In some examples, the request of block 602 may first undergo a server-side permission check. If the request does not pass the server-side permission check, the client may receive an error instead of the ciphertext file. If the request does pass the server-side permission check, then the client can receive the ciphertext file with the key block 310, 312, 314.

At block 606, the client decrypts the key block using a client private key and asymmetric encryption information in the ciphertext file to obtain a secret key and symmetric encryption information. For example, the secret key may have been generated by a client during storage of the file and used to symmetrically encrypt the raw data.

At block 608, the client decrypts the encrypted data using the secret key and symmetric encryption information. For example, the symmetric encryption information can include information such as encryption type and size, which can be used to decrypt the encrypted data.

This process flow diagram is not intended to indicate that the blocks of the method 600 are to be executed in any particular order, or that all of the blocks are to be included in every case. Further, any number of additional blocks not shown may be included within the method 600, depending on the details of the specific implementation.

Figure 7:
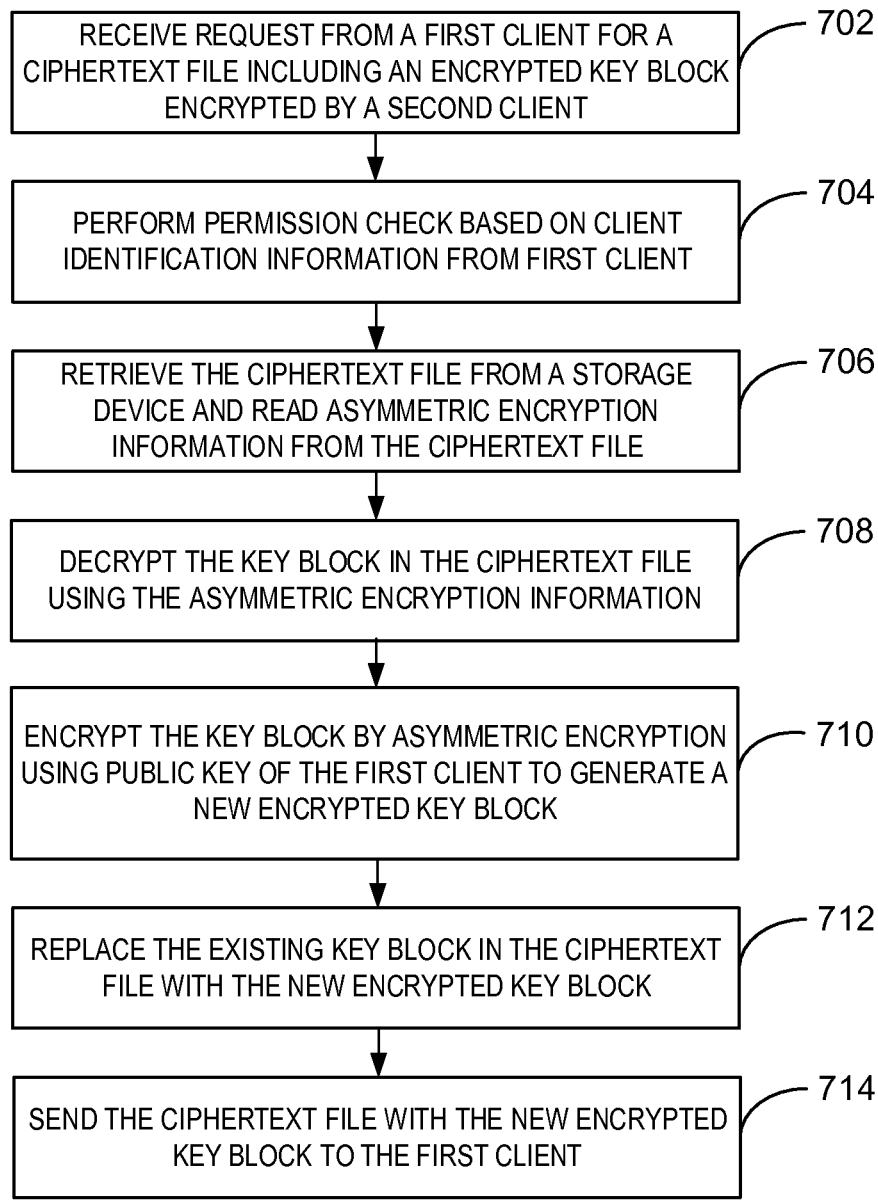
FIG. 7 shows a process flow diagram of an example method for transferring encrypted data.

FIG. 7 shows a process flow diagram of an example method for transferring encrypted data. The method is generally referred to by the reference number 700 and can be implemented using computer 1002. The example method 700 is also discussed with reference to the example systems 200 and 300 and can be implemented by server 224.

At block 702, the server 224 receives client identification information and a request from a first client for a ciphertext file including an encrypted key block encrypted by a second client. For example, the second client may have generated a random secret key to encrypt raw data and encrypted the secret key by asymmetric encryption using a service public key. For example, the server 224 may have sent the service public key to the client before receiving the ciphertext file and sending the ciphertext file to storage 228.

At block 704, the server 224 performs a permission check based on the client identification information from the first client. For example, the server 224 can include a list of clients with permission to access ciphertext file 302. If the requesting client has permission to access the ciphertext file 302, then the permission check passes and the server 224 may proceed to block 706. If the requesting client does not have permission to access the ciphertext file 302, then the server 224 can send the first client an error message or throw an exception.

At block 706, the server 224 retrieves the ciphertext file 302 from storage device and reads asymmetric encryption information from the ciphertext file. For example, the server 224 can detect an encryption type and size from the encryption information of the key block 236 in the ciphertext file 302.

At block 708, the server 224 decrypts the key block in the ciphertext file 302 using the asymmetric encryption information. For example, the server 224 can use a service private key and the asymmetric encryption information to decrypt the key block 236 of ciphertext file 302. The service private key can correspond to the service public key sent to the client in block 702.

At block 710, the server 224 encrypts the key block by asymmetric encryption using a public key of the first client to generate a new encrypted key block. For example, the new encrypted key block 310, 312, 314 can be encrypted using the RSA algorithm, among others. In some examples, the first client may have sent the public key to the server 224 before or with the request for the ciphertext file.

At block 712, server 224 replaces the existing key block in the ciphertext file with the new encrypted key block. For example, the server 224 can replace key block 236 with key block 310, 312, 314 for requesting client 208, 212, 216, respectively.

At block 714, server 224 sends the ciphertext file with the new encrypted key to the first client. For example, the server 224 can send ciphertext file 304, 306, 308 to client 208, 212, 216, respectively. The client 208, 212, 216 may then decrypt the key block 310, 312, 314 using client private key 246, 248, 250 and decrypt the raw data using the resulting secret key.

This process flow diagram is not intended to indicate that the blocks of the method 700 are to be executed in any particular order, or that all of the blocks are to be included in every case. Further, any number of additional blocks not shown may be included within the method 700, depending on the details of the specific implementation.

Figure 8:
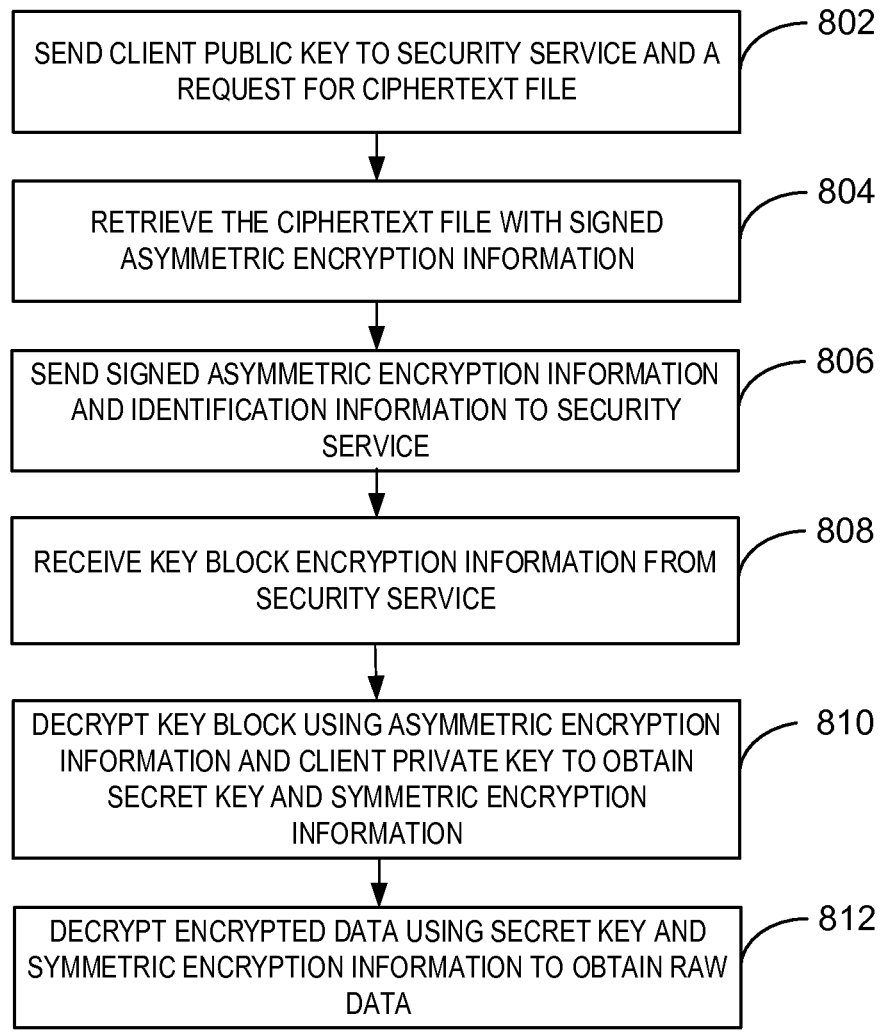
FIG. 8 shows a process flow diagram of an example method for retrieving and sharing data securely using a security service.

FIG. 8 shows a process flow diagram of an example method for retrieving and sharing data securely using a security service. The method is generally referred to by the reference number 800 and can be implemented using the computer 1002. The example method 800 is also discussed with reference to client 216 of example system 400.

At block 802, a client 216 sends a client public key to a security service and sends a request for ciphertext file to a server. For example, the server 406 can be an Information Exchange server, among others. The security service can be performed on a security server 404 that can be any suitable server that may have a security policy that is higher than server 406. For example, security server 404 can be used to store public keys corresponding to the client private keys 246, 248, 250 for the clients 208, 212, 216 of a network. In some examples, if the client does not pass a permission check on the server side, then the client may receive an error. If the client passes the permission check, then the client may receive the ciphertext file as described in block 804 below.

At block 804, the client 216 receives a ciphertext file with signed asymmetric encryption information. For example, the asymmetric encryption information 420 can be signed by server 406 using a digital signature 438. The asymmetric encryption information 420 can include a key block 234 that is asymmetrically encrypted using a service public key, a current time stamp 432, and client identification information 426. The client identification information 426 can be any suitable information used to identify the public key of a client 208, 212, 216. For example, the client identification information can be a watermark, public key information, etc.

At block 806, the client 216 sends the signed asymmetric encryption information and identification information to the security service of security server 408. For example, the identification information can include any suitable information used to find the corresponding client public key. For example, the identification information can include any appropriate identifying information that is defined and agreed between the client and the server. The security server can leverage the digital signature, the client identification information, and the timestamp to verify information integrity. If the integrity verification passes, the process can continue at block 808. If the integrity verification does not pass, the security server can throw an exception to the client.

At block 808, the client 216 receives a key block encryption information 440 from the security service of security server 408. For example, the security server 408 may have decrypted the signed key block 420 using the service private key and encrypted the key block using the client public key corresponding to the requesting client after validating the signature 438 using a service public key and checking the time stamp 432 of the signed key block 420.

At block 810, the client 216 decrypts the key block using asymmetric encryption information and client private key to obtain secret key and symmetric encryption information. For example, the client can use a private key 250 corresponding to the client public key and the asymmetric encryption information from key block 440 to decrypt the key block At block 812, the client 216 decrypts the encrypted data 242 using a secret key and symmetric encryption information to obtain raw data. For example, encrypted data 242 can be decrypted by symmetric decryption using the secret key.

This process flow diagram is not intended to indicate that the blocks of the method 800 are to be executed in any particular order, or that all of the blocks are to be included in every case. Further, any number of additional blocks not shown may be included within the method 800, depending on the details of the specific implementation.

FIG. 9 is intended to provide a brief, general description of a computing environment in which the various techniques described herein may be implemented. For example, the methods and systems for securely storing, sharing, and receiving data described in FIGS. 2-8 can be implemented in such a computing environment. While the claimed subject matter is described below in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 9 is a block diagram of an example operating environment configured for implementing various aspects of the techniques described herein. The example operating environment 900 includes a computer 902. The computer 902 includes a processing unit 904, a system memory 906, and a system bus 908.

The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure, including the memory bus or memory controller, a peripheral bus or external bus, and a local bus using any variety of available bus architectures known to those of ordinary skill in the art. The system memory 906 includes computer-readable storage media that includes volatile memory 910 and nonvolatile memory 912.

The basic input/output system (BIOS), containing the basic routines to transfer information between elements within the computer 902, such as during start-up, is stored in nonvolatile memory 912. By way of illustration, and not limitation, nonvolatile memory 912 can include read-only memory (ROM), programmable ROM (PROM), electrically programmable ROM (EPROM), electrically erasable programmable ROM (EEPROM), or flash memory.

Volatile memory 910 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 902 also includes other computer-readable media, such as removable/non-removable, volatile/non-volatile computer storage media. FIG. 9 shows, for example a disk storage 914. Disk storage 914 includes, but is not limited to, devices like a magnetic disk drive, floppy disk drive, tape drive, Jaz drive, Zip drive, LS-210 drive, flash memory card, or memory stick.

In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer 902.

System applications 920 take advantage of the management of resources by operating system 918 through program modules 922 and program data 924 stored either in system memory 906 or on disk storage 914. It is to be appreciated that the claimed subject matter can be implemented with various operating systems or combinations of operating systems.

A user enters commands or information into the computer 902 through input devices 926. Input devices 926 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 926 connect to the processing unit 904 through the system bus 908 via interface ports 928. Interface ports 928 include, for example, a serial port, a parallel port, a game port, and a universal serial bus (USB).

Output devices 930 use some of the same type of ports as input devices 926. Thus, for example, a USB port may be used to provide input to the computer 902, and to output information from computer 902 to an output device 930.

Output adapter 932 is provided to illustrate that there are some output devices 930 like monitors, speakers, and printers, among other output devices 930, which are accessible via adapters. The output adapters 932 include, by way of illustration and not limitation, video and sound cards that provide a means of connection between the output device 930 and the system bus 908. It can be noted that other devices and systems of devices provide both input and output capabilities such as remote computers 934.

The computer 902 can be a server hosting various software applications in a networked environment using logical connections to one or more remote computers, such as remote computers 934. The remote computers 934 may be client systems configured with web browsers, PC applications, mobile phone applications, and the like. The remote computers 934 can be a personal computer, a server, a router, a network PC, a workstation, a microprocessor based appliance, a mobile phone, a peer device or other common network node and the like, and typically includes many or all of the elements described relative to the computer 902.

Remote computers 934 can be logically connected to the computer 902 through a network interface 936 and then connected via a communication connection 938, which may be wireless. Network interface 936 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 938 refers to the hardware/software employed to connect the network interface 936 to the bus 908. While communication connection 938 is shown for illustrative clarity inside computer 902, it can also be external to the computer 902. The hardware/software for connection to the network interface 936 may include, for exemplary purposes, internal and external technologies such as, mobile phone switches, modems including regular telephone grade modems, cable modems and DSL modems, ISDN adapters, and Ethernet cards.

An example processing unit 904 for the server may be a computing cluster. Additionally, the disk storage 914 can store various types of data 924 used to encrypt files. For example, the disk storage 914 may be an enterprise data storage system, for example, storing data 924 such as encryption data. Encryption data, as used herein, can include encryption type, encryption key size, and keys. For example, secret and/or public keys can be stored on the disk storage 914.

One or more modules 922 can be configured to store and retrieve data securely using hybrid encryption. For example, the modules can include a key generator module 940, a symmetric encryption module 942, an asymmetric encryption module 944, a schema module 946, a storage module 948, and a retrieval module 950. For example, the key generator module 940 can generate a random secret key. For example, the secret key can be any combination of alphanumeric characters. The symmetric encryption module 942 can encrypt raw data by symmetric encryption using the generated secret key. The asymmetric encryption module 944 can further encrypt the secret key by asymmetric encryption using the public key. The schema module 946 can also further generate a ciphertext file with a predefined hybrid encrypted data schema including an encrypted key block. The storage module 948 can then send the ciphertext file to a storage.

In some examples, the retrieval module 950 can be configured to send a request for a ciphertext file. For example, the retrieval module 950 can send the request for a ciphertext file to a server. In some examples, the retrieval module 950 can receive a ciphertext file with a key block encrypted using a public client key. The asymmetric encryption module 944 can decrypt the key block by asymmetric encryption using a private client key to produce a secret key and symmetric encryption information. The symmetric encryption module 942 can then use the secret key and symmetric encryption information to decrypt the encrypted data of the ciphertext file. In some examples, the retrieval module 950 may receive a ciphertext file with a signed key block. The retrieval module 950 can send the signed key block to a security service with identification information. The retrieval module 950 can then receive a key block encrypted using a public client key and the asymmetric encryption module 944 can proceed to decrypt the key block using the private client key and asymmetric encryption information. In some examples, the asymmetric encryption information can include a key block that is asymmetrically encrypted using a service public key, a current time stamp, and client identification information. The client identification information can be any suitable information used to identify the public key of a client. For example, the client identification information can be a watermark, client public key information, etc. In some examples, if client A is retrieving data from a Service, then client B may attempt to steal the data during the network transfer. For example, client B may send the encrypted key block to security service. The security service can thus determine that Client B does not have permission to decrypt the data and reject the data transfer to client B.

It is to be understood that the block diagram of FIG. 9 is not intended to indicate that the computing system 900 is to include all of the components shown in FIG. 9. Rather, the computing system 900 can include fewer or additional components not illustrated in FIG. 9 (e.g., additional applications, additional modules, additional memory devices, additional network interfaces, etc.). Furthermore, any of the functionalities of the key generator module 940, the symmetric encryption module 942, the asymmetric encryption module 944, the schema module 946, the storage module 948, and the retrieval module 950, can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 10:
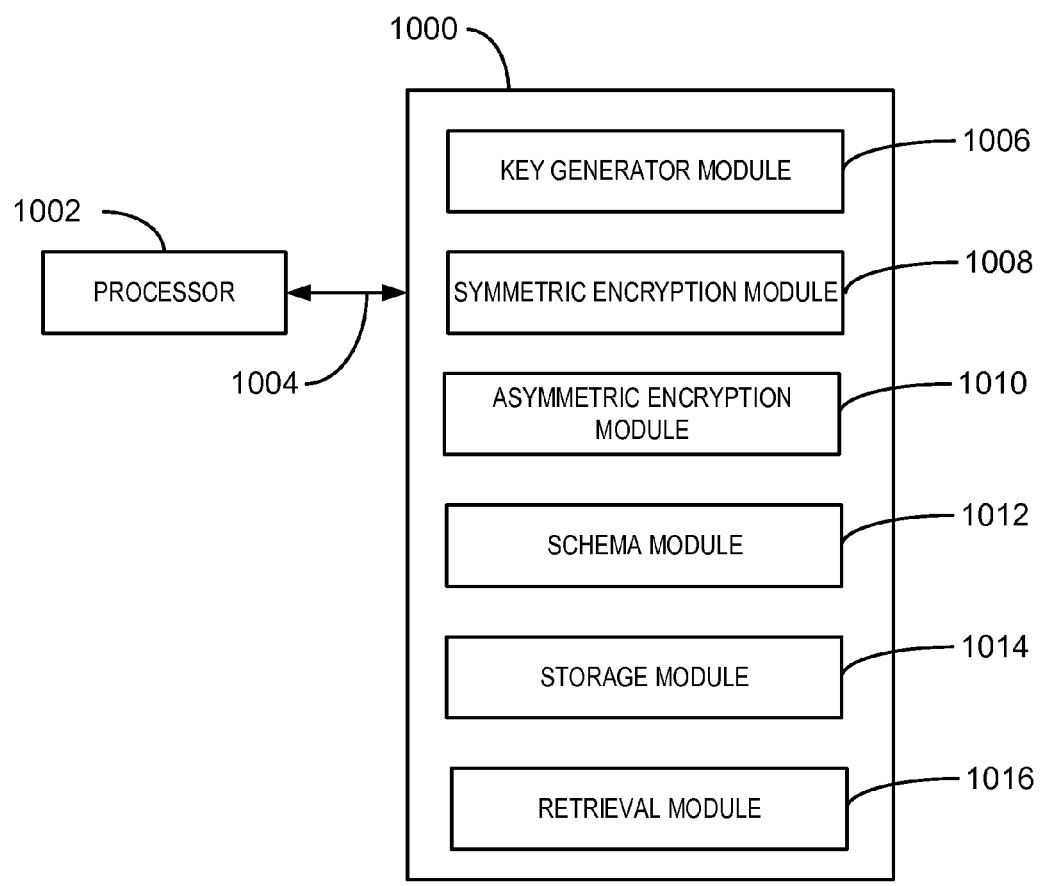
FIG. 10 is a block diagram of an example computer-readable storage medium that can be used to store and transfer files securely.

FIG. 10 is a block diagram showing an example tangible, computer-readable storage medium that can be used to store and transfer files securely. The tangible, computer-readable storage media 1000 can be accessed by a processor 1002 over a computer bus 1004. Furthermore, the tangible, computer-readable storage media 1000 can include code to direct the processor 1002 to perform the current methods. For example, methods 500-800 can be performed by the processor 1002.

The various software components discussed herein can be stored on the tangible, computer-readable storage media 1000, as indicated in FIG. 10. For example, the tangible computer-readable storage media 1000 can include a key generator module 1006, a symmetric encryption module 1008, an asymmetric encryption module 1010, a schema module 1012, a storage module 1014, and a retrieval module 1016. In some implementations, the key generator module 1006 includes code generate a random secret key. For example, the secret key can be any combination of alphanumeric characters. The asymmetric encryption module 1010 includes code to receive a public key from a service. The symmetric encryption module 1008 can include code to encrypt raw data by symmetric encryption using the generated secret key. The asymmetric module 1010 can further include code to encrypt the secret key by asymmetric encryption using the public key. The schema module 1012 can include code to generate a ciphertext file with a predefined hybrid encrypted data schema including an encrypted key block. The storage module 1014 can include code to send the ciphertext file to a storage. The retrieval module 1016 can include code to send a request for a ciphertext file. For example, the retrieval module 1016 can include code to send the request for a ciphertext file to a server. In some examples, the retrieval module 1016 can include code to receive a ciphertext file with a key block encrypted using a public client key. The asymmetric encryption module 1010 can also include code to decrypt the key block by asymmetric encryption using a private client key to produce a secret key and symmetric encryption information. The symmetric encryption module 1008 can further include code to use the secret key and symmetric encryption information to decrypt the encrypted data of the ciphertext file. In some examples, the retrieval module 1016 can include code to receive a ciphertext file with a signed key block. The retrieval module 1016 can include code to send the signed key block to a security service with identification information. For example, the security service may be implemented on a security server. The retrieval module 1016 can further include code to receive a key block encrypted using a public client key and proceed to decrypt the key block using the private client key and asymmetric encryption information. In some examples, the asymmetric encryption information can include a key block that is asymmetrically encrypted using a service public key, a current time stamp, and client identification information. The client identification information can be any suitable information used to identify the public key of a client. For example, the client identification information can be a watermark, public key information, etc.

It is to be understood that any number of additional software components not shown in FIG. 10 can be included within the tangible, computer-readable storage media 1000, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

This example provides for an example system for storing files. The example system includes a key generator module to generate a secret key. The example system can also include a symmetric encryption module to encrypt raw data by symmetric encryption using the secret key. The example system can further include an asymmetric encryption module to encrypt the secret key and symmetric encryption information by asymmetric encryption using a public key to produce a key block. The example system can also further include a schema module to generate a ciphertext file with predefined schema including asymmetric encryption information, the key-block, and the encrypted raw data. The example system can also include a storage module to send the ciphertext file including the encrypted raw data to a server for storage. Alternatively, or in addition, the ciphertext can include a header including the key block. Alternatively, or in addition, the asymmetric encryption information can include an encryption type, a thumbprint, and a key block size. Alternatively, or in addition, the symmetric encryption information can include an encryption type and secret key size. Alternatively, or in addition, server can include a private key associated with the public key. Alternatively, or in addition, the asymmetric encryption type can be a Ron Rivest, Adi Shamir, and Leonard Adleman (RSA) encryption type. Alternatively, or in addition, the symmetric encryption type can be an Advanced Encryption Standard (AES) encryption type.

Example 2

This example provides for an example system for retrieving files. The example system includes a retrieval module to send a public key and a request for a ciphertext file including a key block and encrypted data and receive the ciphertext file with the key block encrypted using the public key. The example system can also include an asymmetric encryption module to decrypt the key block of the encrypted file using a client private key and asymmetric encryption information in the ciphertext file to obtain a secret key and symmetric encryption information. The example system can also further include a symmetric encryption module to decrypt the encrypted data using the secret key and the symmetric encryption information. Alternatively, or in addition, the retrieval module can receive the ciphertext file with signed asymmetric encryption information. Alternatively, or in addition, the retrieval module can send the signed asymmetric encryption information and identification information to a security service. Alternatively, or in addition, the retrieval module can receive the key block encrypted using the public key from the security service. Alternatively, or in addition, the signed asymmetric encryption information can include an asymmetrically encrypted key block, a time stamp, and client identification information. Alternatively, or in addition, the client identification information can include a watermark to be used to identify a public key of the client on the security service. Alternatively, or in addition, the secret key can be a randomly generated secret key. Alternatively, or in addition, the asymmetric encryption information can include an encryption type, a thumbprint, and a key block size. Alternatively, or in addition, the symmetric encryption information can include an encryption type and secret key size.

Example 3

This example provides for an example method for transferring encrypted data. The example method can include receiving client identification information and a request from a first client for a ciphertext file including an encrypted key block encrypted by a second client. The example method can also include performing permission check based on the client identification information from the first client. The example method can also include retrieving the ciphertext file from a storage device and reading asymmetric encryption information from schema in the ciphertext file if the permission check passes. The example method can further include decrypting the key block in the ciphertext file using the asymmetric encryption information. The example method can also further include encrypting the key block by asymmetric encryption using a public key of the first client to generate a new encrypted key block. The example method can also include replacing the existing key block in the ciphertext file with the new encrypted key block to generate an updated ciphertext file. The example method can also further include sending the updated ciphertext file with the new encrypted key block to the first client. Alternatively, or in addition, the example method may include sending an error to the first client if the permission check fails. Alternatively, or in addition, the example method may include sending the ciphertext with a signed key block to the first client. The signed key block can be verified by a security service. The security service can perform the decrypting of the key block in the ciphertext file using the asymmetric encryption information and the encrypting of the key block by asymmetric encryption using the public key of the first client to generate the new encrypted key block. Alternatively, or in addition, the example method may include inserting a time stamp into the signed key block sent to the first client. Alternatively, or in addition, the example method may include receiving a second ciphertext file from the second client, the ciphertext file to be a different randomly generated secret key. Alternatively, or in addition, the example method may include receiving a public key from the first client and the second client.

Example 4

This example provides for one or more computer-readable storage medium for storing computer readable instructions that, when executed by one or more processing devices, instruct the storage of files. The computer-readable medium includes instructions to generate a secret key. The computer-readable medium also includes instructions to encrypt raw data by symmetric encryption using the secret key. The computer-readable medium includes instructions to encrypt the secret key and symmetric encryption information by asymmetric encryption using a public key to produce a key block. Further, the computer-readable medium includes instructions to generate a ciphertext file with predefined schema including asymmetric encryption information, the key-block, and the encrypted raw data. The computer-readable medium also further includes instructions to send the ciphertext file including the encrypted raw data to a server for storage. Alternatively, or in addition, the ciphertext can include a header including the key block. Alternatively, or in addition, the asymmetric encryption information can include an encryption type, a thumbprint, and a key block size. Alternatively, or in addition, the symmetric encryption information can include an encryption type and secret key size. Alternatively, or in addition, the asymmetric encryption type can be a Ron Rivest, Adi Shamir, and Leonard Adleman (RSA) encryption type. Alternatively, or in addition, the symmetric encryption type can be an Advanced Encryption Standard (AES) encryption type.

Example 5

This example provides for one or more computer-readable storage medium for storing computer readable instructions that, when executed by one or more processing devices, instruct the retrieval of files. The computer-readable medium includes instructions to send a public key and a request for a ciphertext file including a key block and encrypted data and receive the ciphertext file with the key block encrypted using the public key. The computer-readable medium also includes instructions to decrypt the key block of the encrypted file using a client private key and asymmetric encryption information in the ciphertext file to obtain a secret key and symmetric encryption information. The computer-readable medium includes instructions to a symmetric encryption module to decrypt the encrypted data using the secret key and the symmetric encryption information. Alternatively, or in addition, the computer-readable medium can include instructions to receive the ciphertext file with signed asymmetric encryption information. Alternatively, or in addition, the computer-readable medium can include instructions to send the signed asymmetric encryption information and identification information to a security service. Alternatively, or in addition, the computer-readable medium can include instructions to receive the key block encrypted using the public key from the security service. Alternatively, or in addition, the signed asymmetric encryption information can include an asymmetrically encrypted key block, a time stamp, and client identification information. Alternatively, or in addition, the client identification information can include a watermark to be used to identify a public key of the client on the security service. Alternatively, or in addition, the secret key can be a randomly generated secret key. Alternatively, or in addition, the asymmetric encryption information can include an encryption type, a thumbprint, and a key block size. Alternatively, or in addition, the symmetric encryption information can include an encryption type and secret key size.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for storing files, comprising:
a client device, comprising:
a key generator to generate a secret key;
a symmetric encrypter to encrypt raw data by symmetric encryption using the secret key;
an asymmetric encrypter to encrypt the secret key and symmetric encryption information by asymmetric encryption using a public service key to produce a key block, wherein the symmetric encryption information comprises an encryption type and secret key size;
a schema generator to generate a ciphertext file with predefined schema comprising asymmetric encryption information, the key block, and the encrypted raw data, wherein the asymmetric encryption information comprises an encryption type, a thumbprint, and a key block size; and
a storage sender to send the ciphertext file comprising the encrypted raw data to a first server device for storage and, in response to a request for raw data comprising a security level above a threshold security level corresponding to the encrypted raw data, receive a modified ciphertext file comprising the encrypted raw data and digitally signed encryption information comprising the asymmetric encryption information as digitally signed by the first server device from the first server device, send the digitally signed encryption information to a second server device, and receive a reencrypted key block comprising the assymetric encryption information as reencrypted by the second server device, a secret key, and the symmetric encryption information to decrypt the encrypted raw data.

2. The system of claim 1, the ciphertext file comprising a header comprising the key block.

3. The system of claim 1, the second server device comprising a private service key associated with the public service key.

4. The system of claim 1, the asymmetric encryption type comprising a Ron Rivest, Adi Shamir, and Leonard Adleman (RSA) encryption type.

5. The system of claim 1, the symmetric encryption type comprising an Advanced Encryption Standard (AES) encryption type.

6. A system for retrieving files, comprising:
a second server device comprising:
a receiver to receive a key block corresponding to encrypted raw data requested by a client device and digitally signed asymmetric encryption information from a first server device the asymmetric encryption information comprising an encryption type, a thumbprint, and a key block size;
an encrypter to reencrypt the key block using a public key corresponding to a client private key, the digitally signed asymmetric encryption information used to decrypt the key block to generate a secret key and symmetric encryption information, the encrypter to reencrypt the secret key and the symmetric encryption using the public key to generate a reencrypted key block, the symmetric encryption information comprising an encryption type and a secret key size; and
a transmitter to send the reencrypted key block to the client device for decryption using the client private key.

7. The system of claim 6, the digitally signed asymmetric encryption information comprising an asymmetrically encrypted key block, a time stamp, and client identification information.

8. The system of claim 7, the client identification information comprising a watermark to be used to identify a public key of the client device on the second server device.

9. The system of claim 6, the secret key comprising a randomly generated secret key.

10. A method for transferring encrypted data, the method comprising:
receiving, at a first server device, client identification information and a request from a first client device for a ciphertext file comprising an encrypted key block encrypted by a second client device using a service public key;
performing, at the first server device, a permission check based on the client identification information from the first client device;
retrieving, at the first server device, the ciphertext file from a storage device and reading asymmetric encryption information from the ciphertext file if the permission check passes;
digitally signing at the first server device, in response to detecting the ciphertext file corresponds to raw data that has a security level above a threshold security level, the asymmetric encryption information using a digital signature to be verified by a second server device;
replacing, at the first server device, the asymmetric encryption information in the ciphertext file with the digitally signed asymmetric encryption information to generate an updated ciphertext file; and
sending, from the first server device, the updated ciphertext file with the digitally signed asymmetric encryption information to the first client device.

11. The method of claim 10, further comprising sending an error to the first client device if the permission check fails.

12. The method of claim 10, the digitally signed asymmetric encryption information to be verified by a security service of the second server device, the security service to perform the decrypting of the encrypted key block in the ciphertext file using the digitally signed asymmetric encryption information and a service private key, and the encrypting of the decrypted key block by asymmetric encryption using the public key of the first client device to generate a new encrypted key block.

13. The method of claim 12, further comprising inserting a time stamp into the digitally signed asymmetric encryption information sent to the first client device.

14. The method of claim 10, further comprising receiving a second ciphertext file from the second client device, the ciphertext file comprising a different randomly generated secret key.

15. The method of claim 10, further comprising receiving a public key from the first client device and the second client device and including the public key of the first client device in the ciphertext file, the public key of the first client device to be used by the second server device to reencrypt the asymmetric encryption information.

* * * * *